United States Patent
Sastry et al.

(10) Patent No.: US 6,687,877 B1
(45) Date of Patent: Feb. 3, 2004

(54) WEB-BASED CALL CENTER SYSTEM WITH WEB DOCUMENT ANNOTATION

(75) Inventors: Chellury R. Sastry, Plainsboro, NJ (US); Darrin P. Lewis, North Brunswick, NJ (US); Arturo Pizano, Belle Mead, NJ (US); Uwe Wrede, San Jose, CA (US); Michael Sassin, Lawrenceville, NJ (US); Shmuel Shaffer, Palo Alto, CA (US)

(73) Assignees: Siemens Corp. Research Inc., Princeton, NJ (US); Siemens Information & Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/251,704

(22) Filed: Feb. 17, 1999

(51) Int. Cl.[7] ............................................. G06F 15/00

(52) U.S. Cl. .................... 715/512; 715/500; 715/501.1; 345/751; 709/204

(58) Field of Search ......................... 707/512; 709/204; 345/751; 715/512, 500, 501.1

(56) References Cited

U.S. PATENT DOCUMENTS

| | | | |
|---|---|---|---|
| 5,450,482 A | | 9/1995 | Chen |
| 5,825,869 A | | 10/1998 | Brooks et al. |
| 5,826,025 A | | 10/1998 | Gramlich |
| 5,838,313 A | * | 11/1998 | Hou et al. ................. 715/500.1 |
| 5,850,517 A | * | 12/1998 | Verkler et al. .............. 370/401 |
| 5,884,032 A | | 3/1999 | Bateman |
| 5,884,256 A | * | 3/1999 | Bennett et al. ............. 704/235 |
| 5,920,621 A | | 7/1999 | Gotlieb |
| 5,920,694 A | * | 7/1999 | Carleton et al. ............ 345/753 |
| 5,996,002 A | * | 11/1999 | Katsurabayashi et al. ... 709/204 |
| 5,996,022 A | * | 11/1999 | Krueger et al. ............. 370/235 |

(List continued on next page.)

FOREIGN PATENT DOCUMENTS

WO WO 99/16218 4/1999 ............ H04L/12/66

OTHER PUBLICATIONS

"Virtual meetings with Desktop Conference", IEEE spectrum Jul. 1998, pp. 47–56.*
Moran et al., "Tailorable Domain Objects as Metting Tools for an Electronic Whiteboard", Copyright ACM 1998, pp. 295–304.*
Pullen, "Synchronous Distance Education Via the Internet", IEEE FIE'96 Proceeding, pp. 285–288.*
Kuo et al., "A Synchronization Scheme for Multimedia Annotation", IEEE 1997, pp. 594–598.*

*Primary Examiner*—Stephen S. Hong
*Assistant Examiner*—Thu Vy Huynh

(57) ABSTRACT

A web-based call center and a method for its operation include multiple agent and customer terminals connected to a web server. The agent terminals and the customer terminals include a web browser for accessing web documents from the web server and annotation plug-in software for recording and replaying static and dynamic annotations on web documents. An HTML document registration tool formats web documents prior to storage on the web server, so that the web documents are formatted for annotation. An annotation server includes a database for storing annotated documents received from agent and customer terminals. Indexing software associated with the annotation server extracts key information from annotations received from customer terminals as part of callback requests. The extracted key information is indicative of a skills set which is required by an agent in order to handle the callback request. An ACD server utilizes the key information to route callback requests to qualified call center agents. A customer terminal can transmit an information request in the form of a telephone call, a fax transmission, an e-mail, or a callback request which includes an annotated web document. An agent terminal can respond to the information request by telephone, fax, e-mail, or by returning an annotated web document. Alternatively, the customer and agent terminals can initiate a dynamic annotation data sharing session.

15 Claims, 5 Drawing Sheets

U.S. PATENT DOCUMENTS

| | | | |
|---|---|---|---|
| 5,999,965 A | | 12/1999 | Kelly |
| 6,021,428 A | * | 2/2000 | Miloslavsky ................ 709/104 |
| 6,058,163 A | * | 5/2000 | Pattison et al. ............. 379/133 |
| 6,061,347 A | | 5/2000 | Hollatz |
| 6,105,055 A | * | 8/2000 | Pizano et al. ............... 709/204 |
| 6,122,364 A | | 9/2000 | Petrunka |
| 6,201,948 B1 | * | 3/2001 | Cook et al. .................. 434/350 |
| 6,230,171 B1 | * | 5/2001 | Pacifici et al. .............. 345/751 |
| 6,230,172 B1 | * | 5/2001 | Purnaveja et al. .......... 707/500 |
| 6,332,147 B1 | * | 12/2001 | Moran et al. ............ 707/500.1 |
| 6,484,156 B1 | * | 11/2002 | Gupta et al. .................... 707/1 |

* cited by examiner

WEB-BASED CALL CENTER SYSTEM WITH WEB DOCUMENT ANNOTATION

BACKGROUND OF THE INVENTION

The present invention relates generally to communications systems and, more specifically, to web-based call center systems.

DESCRIPTION OF THE RELATED ART

Call centers are commonly employed in businesses which process a large number of incoming calls. Airlines utilize call centers to provide flight information for arriving and departing flights and to process ticket purchases for customers over the phone. Home mortgage firms employ call centers to provide information to prospective customers and to provide refinancing information to current customers. Additionally, consumer retail companies often use call centers to process purchase orders and to provide technical support to answer customer questions.

Conventional call centers generally include one or more Private Branch Exchanges (PBXs) to connect multiple agents to incoming callers. An Automatic Call Distributor (ACD) of the PBX automatically routes incoming calls to available agents. If an incoming call is received at a time when all of the agents are handling incoming calls, the ACD places the call on hold until an agent becomes available, at which point the ACD routes the call to the available agent. To increase the capacity of the system to handle a greater volume of calls, additional PBXs and agents can be added to the call center.

Call centers provide the benefit of handling large volumes of incoming calls efficiently. Furthermore, routing schemes have been developed to ensure that incoming calls are directed to the appropriate agents. For example, the call center agents can be divided into two groups having different areas of expertise, where a first group is trained for processing purchase orders and a second group is trained to provide product support. An Interactive Voice Response (IVR) unit can be incorporated into the call center to identify the subject matter for each of the incoming calls. Upon connecting to the call center, the IVR presents a caller with the option of being routed to a call center agent to complete a purchase order or to receive technical assistance. A higher level of routing specificity can be achieved by presenting the caller with options regarding the type of technical support that is desired. U.S. Pat. No. 5,825,869 to Brooks et al. describes a skills-based system for routing a call to an appropriately skilled ACD agent. The ACD responds to selections made by the caller by connecting the caller to one of the agents in the appropriate expert group. In this manner, the caller is efficiently connected to a qualified agent without requiring one of the agents to assess the requirements of the call and transfer the caller to the appropriate agent.

However, the problem for which a caller requires assistance is often not amenable to solution over a standard telephone call. For example, if a caller is attempting a complicated operation, such as a repair or an upgrade for a component of a computer system, receiving instructions over the telephone can be tedious and inefficient. The process through which the caller must navigate to perform the operation can be difficult to describe verbally. As a result, the caller might make errors which result in substantial delays in solving the problem. Additionally, the caller might have to put the phone down while attempting to carry out the instructions of the agent. This can result in the agent spending a significant amount of time waiting while the caller performs various operations. Alternatively, the caller can disconnect from the call center while he or she attempts to carry out the instructions from the agent, and call back if the caller requires further instructions. This alternative results in the caller wasting time calling back the call center. The delay becomes even more objectionable if, after the caller disconnects from the call center, the agent receives another incoming call. The caller will either have to begin again with a second call center agent by re-explaining the entire problem to the second agent, or the caller will have to wait until the first agent becomes available again.

What is needed is a call center and a method for utilizing the call center to enable customers and agents to exchange information for solving sophisticated problems in a manner that overcomes the above-described limitations.

SUMMARY OF THE INVENTION

A method for operating a call center includes enabling annotation capabilities and includes the steps of recording a particular sequence of multimedia actions on a first document and transmitting the sequence of multimedia actions to a second terminal as a part of either a callback request or a response to a callback request. The recorded sequence of multimedia actions performed on the first document constitutes a dynamic annotation of the first document. The dynamic annotation can include recording voice and/or video information synchronized with other forms of information, such as the manipulation of images, video, and/or text.

In a preferred embodiment, the call center is a web-based call center coupled to a call center agent terminal and a customer terminal. Multiple documents, for example web pages, are formatted to enable capture of the dynamic annotations performed on the web pages. The formatted web pages are then stored in a web server. The formatting process enables capture of user-generated multimedia actions utilizing plug-in annotation software and a web browser which is not designed for dynamic annotation, for example a standard commercial browser. Code which is inserted into a web document during formatting captures the user-generated multimedia actions during an annotation session and passes them to the plug-in software for storage and rendering. The capture of the multimedia actions occurs in a nonintrusive fashion in that the underlying HTML code of the web page is unaltered and the operation navigation function of the web browser is not affected by the capture of the multimedia actions. The multimedia actions include recording user-generated hyperlink traversals, text, drawings, pointer gestures, voice information, and video information synchronized with manipulation of voice objects, video objects, text objects, and image objects within the web pages.

In a specific embodiment, the call center agent obtains at least one of the formatted web pages from the web server and enters dynamic annotations into the formatted web pages in response to a callback request received from the customer terminal. The dynamic annotations (either in isolation or in combination with the web pages) are transmitted to an annotation server as part of the response to the callback request. The agent terminal informs the customer terminal of the presence of the annotated web pages on the annotation server by, for instance, transmitting an e-mail message which contains the Universal Resource Locator (URL) of the annotated web pages on the annotation server. As an alternative to storing the annotated web pages in their entirety, data representing the annotation can be stored at the annotation server independently of the underlying web pages. The annotation data can be downloaded by the customer terminal as an annotation overlay. Access to the dynamic annotations can be restricted by requiring a password for access.

In a another specific embodiment, the customer terminal enters the dynamic annotations on the formatted web pages, and the annotated web page is transmitted as a callback request. The dynamic annotation can be performed while the customer terminal is navigating through formatted web pages located on a call center web server. The dynamically annotated web pages are submitted to the annotation server for subsequent access by the agent terminal. An ACD connected to the annotation server routes the annotated web pages to the agent terminal. In the preferred embodiment, the ACD performs a skills-based analysis of the annotated web pages to determine a set of skills which an agent preferably possesses to process the callback request. The routing of the callback request is performed in response to a correlation of the skills set associated with the callback request to the skills sets associated with various call center agents.

In yet another embodiment, the exchange of dynamic annotation data between the agent terminal and the customer terminal occurs within a data sharing session. After the customer terminal has transmitted a callback request, the agent terminal can initiate the data sharing session by enabling its web browser and annotation plug-in software and by requesting the customer terminal to activate its web browser and annotation plug-in software. Alternatively, the customer terminal can initiate the data sharing session in the same manner. The agent terminal proceeds to dynamically annotate one or more formatted web pages by adding text, graphics, freehand drawings, video, and/or voice overlays onto the web pages. Instead of locally saving the dynamic annotation session at the agent terminal and then uploading it onto the annotation server for subsequent access by the customer terminal, the agent terminal streams the user actions comprising the dynamic annotation data through the annotation server to the customer terminal. The various multimedia components of the dynamic annotation data (voice, video, text, freehand drawings) are all synchronized at the customer terminal prior to presentation to the customer. The process is performed in the same fashion if the customer terminal is generating the annotation data. Alternatively, the data sharing session can occur without activating the plug-in software in the customer and agent terminals. In this alternative embodiment, the user-generated multimedia actions are submitted to the annotation server which utilizes plug-in software to process the user-generated multimedia actions before streaming them out to one of the terminals.

In other embodiments, the annotation server system is utilized for educational purposes to provide professional training or academic instruction. For example, a student can receive review of an assignment in the form of a dynamically annotated version of the assignment generated at a teacher's terminal.

DETAILED DESCRIPTION

Figure 1:
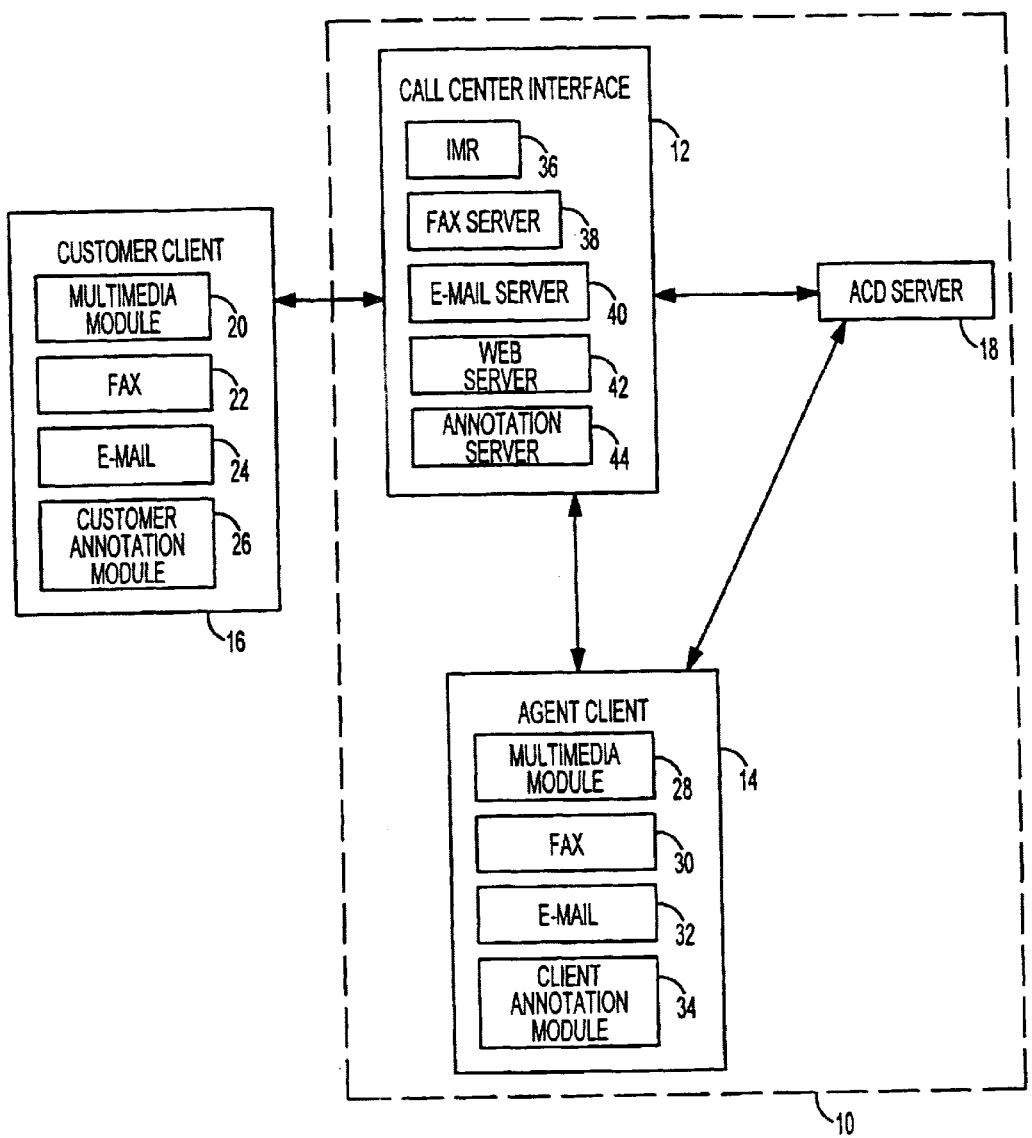
FIG. 1 is a high level block diagram of the functions of a call center interface, a customer client, and an agent client in accordance with the present invention.

Referring to FIG. 1, a web-based call center 10 includes a call center interface 12, an Automatic Call Distributor (ACD) server 18, and an agent client 14. The call center interface 12 provides an interface for communicating with a multimedia module 20 of a customer client 16 by means of an interactive multimedia response (IMR) unit 36. The multimedia module 20, which can be an H.323 device, provides telephony as well as video teleconferencing capability to the customer client 16. The customer client 16 can also be equipped with a stand-alone telephone (not shown). The IMR unit 36 elicits from the customer client 16 responses which provide key information regarding the subject matter of a multimedia call. The information can be utilized to route the incoming call to an appropriate call center agent. A fax server 38 provides an interface for communicating with a fax device 22 of the customer client 16, and an e-mail server 40 provides an interface for communicating with the customer client via e-mail capability 24. The customer client 16 is capable of communicating with the agent client 14 via telephone, fax or e-mail. The agent client 14 is also equipped with a multimedia module 28, a fax device 30, and e-mail capability 32. The ACD server 18 performs routing of incoming calls to call center agents.

As will be discussed in greater detail below, a customer annotation module 26 enables the customer client 16 to enter dynamic and static annotation data into web documents obtained from a web server 42 (FIG. 2) and to play back dynamically-annotated web documents. An annotation server 44 stores the annotated web documents for retrieval by the customer client 16 and the agent client 14. Optionally, the servers 42 and 44 may be a single unit. An agent client annotation module 34 enables the agent client to enter dynamic and static annotations into web documents obtained from the web server 42.

Figure 2:
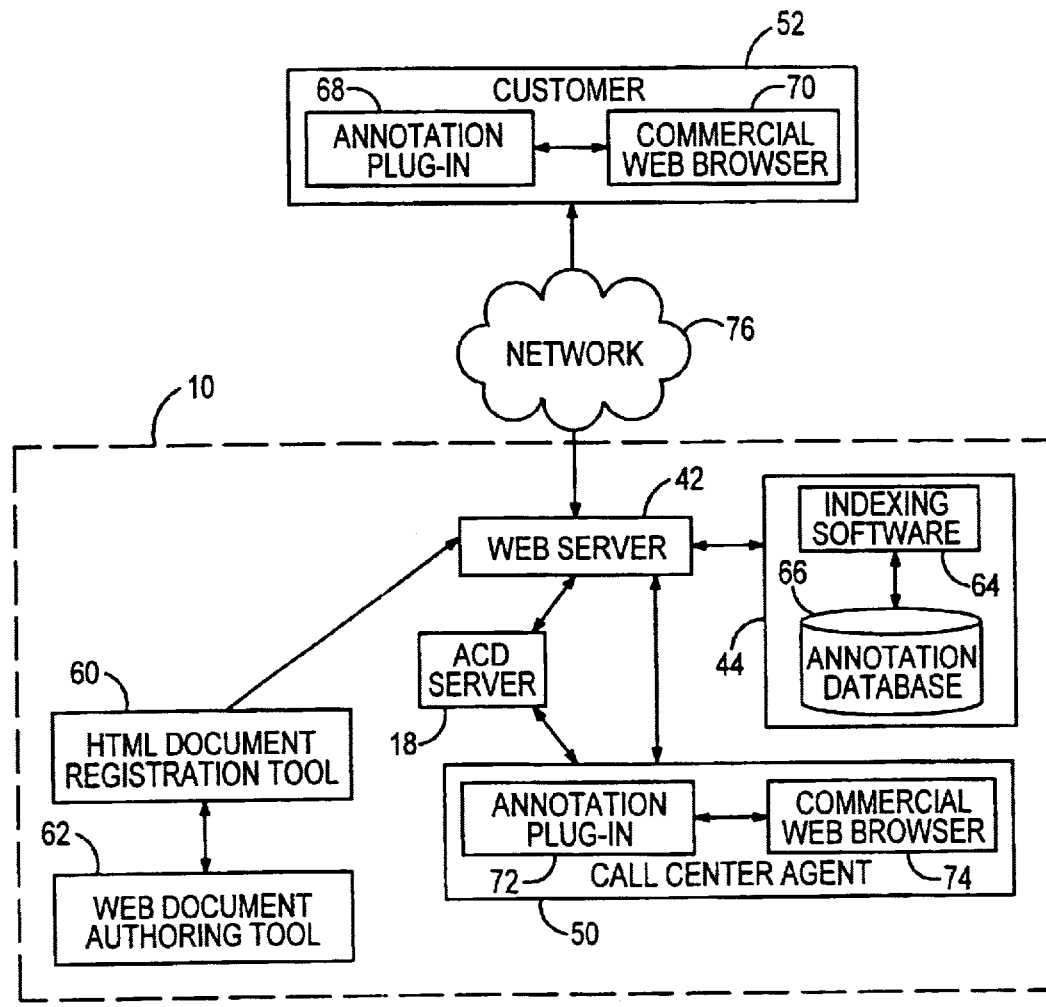
FIG. 2 is a block diagram illustrating the call center of FIG. 1 which utilizes dynamic web document annotation according to the present invention.

With reference to FIG. 2, the web-based call center 10 further includes a web document authoring tool 62. The web document authoring tool can be an off-the-shelf product for generating web pages. A Hyper Text Markup Language (HTML) document registration tool 60 is utilized to format web documents to make them compatible with dynamic and static annotation. In a preferred embodiment, the HTML document registration tool 60 is configured to automatically format specified web documents which have been authored by the web document authoring tool 62.

If web documents are not formatted for dynamic annotations, the customer and agent clients 14 and 16 will not be able to capture user-generated multimedia actions if they utilize standard commercial browsers which are not designed for dynamic annotation. The document registration tool 60 inserts code into the web documents which is based on open technologies. For example, the document registration tool might insert Java Script code. During an annotation session performed utilizing a commercial web browser which is not designed for dynamic annotation, the inserted code enables the capture of the user-generated multimedia actions. The formatting of the web documents does not interfere with the navigational functionalities of a commercial web browser. Although FIG. 2 shows the HTML document registration tool 60 as being associated with the web server 42, the function of the document registration tool can be incorporated into a customer terminal 52 or a call center agent terminal 50. In this case, either terminal can perform dynamic annotations on any web document during a browsing session by simply formatting a web document after downloading it and prior to loading it into a commercial browser.

Once the HTML document registration process has been performed on a web document, it is uploaded to the web server 42, where the formatted web document can be accessed by the call center agent terminal 50 and the customer terminal 52. Although only a single agent terminal is shown, the call center agent terminal 50 is preferably one of multiple agent terminals for handling incoming calls to the web-based call center 10. The web server 42 can be accessed by the customer terminal 52 via a communications network 76, such as a Public Switch Telephone Network (PSTN), a Local Area Network (LAN), or the global communications network known as the Internet.

The web documents which are typically formatted by the HTML document registration process include call center web pages which are designed to answer and/or solicit questions from customers visiting the call center web site. For example, if the call center 10 is intended to provide technical product support, the call center web site might include multiple diagrams of the product from different perspectives. By formatting these web pages utilizing the HTML document registration tool 60, the customer terminal 52 can access the call center web pages which include the product diagrams and execute an annotation session on the web pages as part of a request for information. The annotation session can either be a dynamic annotation session in which the customer's multimedia actions are recorded and synchronized with voice and video data or a static annotation session.

Annotation of formatted documents includes adding and/ or deleting multimedia data objects into a web document and manipulating the multimedia data objects in a selective manner. Manipulation of multimedia objects includes freely drawing or deleting graphics, adding or deleting audio data and video data, and typing or deleting text within the web document. Multimedia objects include image files, video files, text files, and audio files. The actions of moving, creating, or deleting text and multimedia objects can be recorded during a dynamic annotation session. Voice and video information and the traversal of hyperlinks between web pages can also be recorded during a dynamic annotation session in such a manner that the hyperlink traversal and the video and voice information are synchronized with multimedia object manipulations. The recorded annotation sessions can then be played back at a later time, so that the multimedia actions are synchronized with the recorded voice, video, and hyperlink traversals. Moreover, the multimedia actions are displayed during playback in the same sequence as they were recorded. In a static annotation session, the manipulations are recorded into a single static file. That is, the added or deleted text data objects and multimedia data objects are represented in a single frame.

The web server 42 receives the submissions from the customer terminals 52 and directs callback requests, along with the annotated web pages, for storage in the annotation server 44, which includes an annotation database 66 and indexing software 64. The annotation database 66 stores uploaded annotations and is preferably implemented using commercial relational database technology. The indexing software 64 extracts key information from the annotated web pages which are included in the callback request. Such key information can include key words or values contained in text entered by the customer. The indexing software 64 has speech recognition capability for extracting key words from voice information included in dynamic annotations. In addition, the indexing software 64 automatically extracts key words from the underlying web documents. For example, the indexing software might extract key words from a title of the document, main headings, and subsections of the document. The extracted key information, which is stored in the annotation database 66, provides an indication as to the skills which will be required by a call center agent to process the callback request.

The ACD server 18 routes callback requests to available agents. In one embodiment, the ACD server 18 routes callback requests to call center agents as they become available on a first-in-first-out basis. However, a call center may employ multiple call center agents who are grouped based on expertise which the agents possess for handling specific types of incoming calls. For example, some of the call agents might have expertise in processing product orders, while the other agents possess expertise in different areas of technical product support. In a preferred embodiment, the ACD server 18 stores data regarding the specific skills which are associated with each call center agent, as well as which call center agent is located at which agent terminal. When a call center agent becomes available, the ACD server 18 identifies the set of skills which the available agent possesses for handling calls. The ACD server then communicates with the annotation database 66 to select a callback request based on key information associated with the callback requests which are queued for the call center 10.

The annotation function in the customer terminal is performed by annotation plug-in software 68 which is designed to operate with a commercial web browser 70. The plug-in software 68 enables the customer terminal to record dynamic annotations on web pages and to play back 9 dynamically annotated web documents. The call center agent terminal 50 also includes a commercial web browser 74 and annotation plug-in software 72 to enable the agent terminal to play back dynamically annotated web documents and to record dynamic and static annotations on web documents obtained from the web server 42. As previously noted, the code inserted into the formatted web documents enables capture of multimedia actions executed during a dynamic annotation session. The annotation plug-in software 68 and 72 stores the multimedia actions and replays them. The plug-in software has several Graphical User Interface (GUI) buttons, including RECORD to record a session, STOP to stop recording or playback, PAUSE to pause recording or playback, PLAYBACK to playback a session stored in memory, and UPLOAD to upload a session to the annotation server 44. The annotation plug-in software 68 and 72 does not interfere with the navigational functionalities of the commercial web browser 70 and 74.

Figure 3:
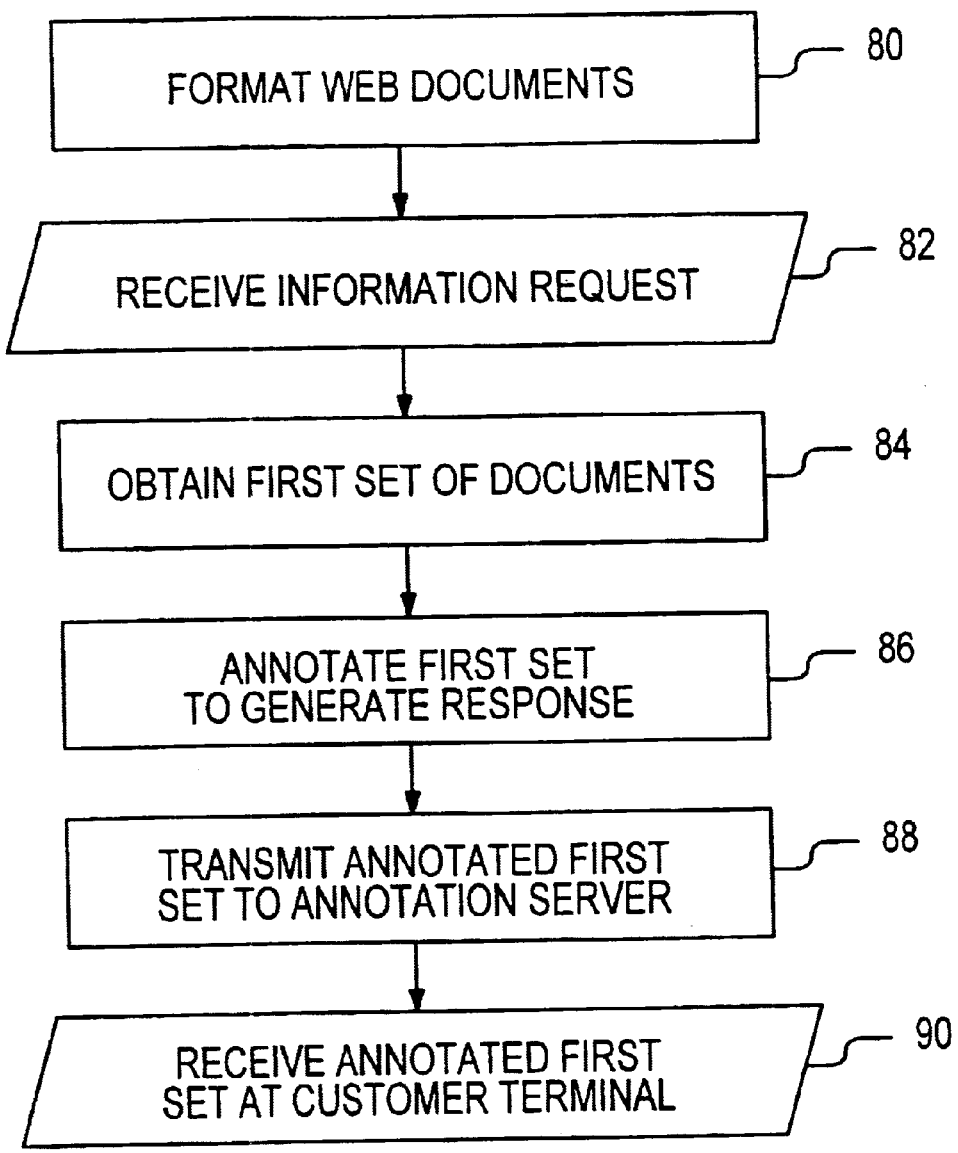
FIG. 3 is a process flow for a method for responding to a callback request utilizing the call center of FIG. 2.

With reference to FIGS. 2 and 3, a communications method for responding to a callback request utilizing the call center 10 includes the step 80 of formatting web documents by executing the HTML document registration process. The HTML document registration tool 60 receives web documents from the web document authoring tool 62 and automatically inserts code into the web documents to make the web documents annotatable. The formatted web documents are stored in the web server 42, where they are accessible by the customer terminal 52 and the agent terminal 50. At step 82, an information request is received from the customer via telephone, fax, e-mail, or a web callback request. The device utilized to convey the information request can be an H.323 device. If the information request is in the form of a web callback request which includes an annotated web page, the indexing software 64 executes a search for key information. The key information search is directed toward finding key words in annotated text, information regarding the identity of the web pages that were annotated and, if the callback request includes a dynamic annotation, any key words within the voice data that was included in the annotation.

The ACD server 18 utilizes the key information to identify a skills set which is preferably possessed by a call center agent in order to handle the callback request and routes the callback request to an ACD agent with the preferred skill set. If the agent decides that the most effective way to respond to the callback request is to perform an annotation of a web document and transmit the annotated document to the customer terminal 52, the agent utilizes the commercial web browser 74 to obtain one or more web documents from the web server 42 at step 84. At step 86, the agent utilizes the annotation plug-in software 72 of the agent terminal 50 to annotate the received web documents. The annotation is preferably a dynamic annotation in which agent actions (such as movement of a pointer icon, traversal of hyperlinks between web pages, manipulation of graphic objects, text objects, image objects, or video objects) are coordinated with recording the agent's voice. The customer can play back the annotation session, so that the customer is able to listen and view the response to the callback request much as though the response were a live presentation. Alternatively, the callback request can be in the form of a static annotation.

When the annotation process has been completed, the annotated web documents are submitted to the annotation server 44 at step 88 for storage in the annotation database 66. The agent terminal 50 communicates the URL of the stored annotated web documents to the customer via e-mail, fax or by telephone. The customer accesses the annotated web documents at step 90 utilizing the URL. Because the customer is the only individual to whom the URL of the annotated web documents are provided, the method provides communications security in the event that the annotated web documents contain confidential information. Alternatively, the agent can provide the customer with a password for accessing a dynamic annotation session. In this case, the customer terminal can enter the password at an appropriate prompt within a call center web page to download the dynamic annotation session.

Figure 4:
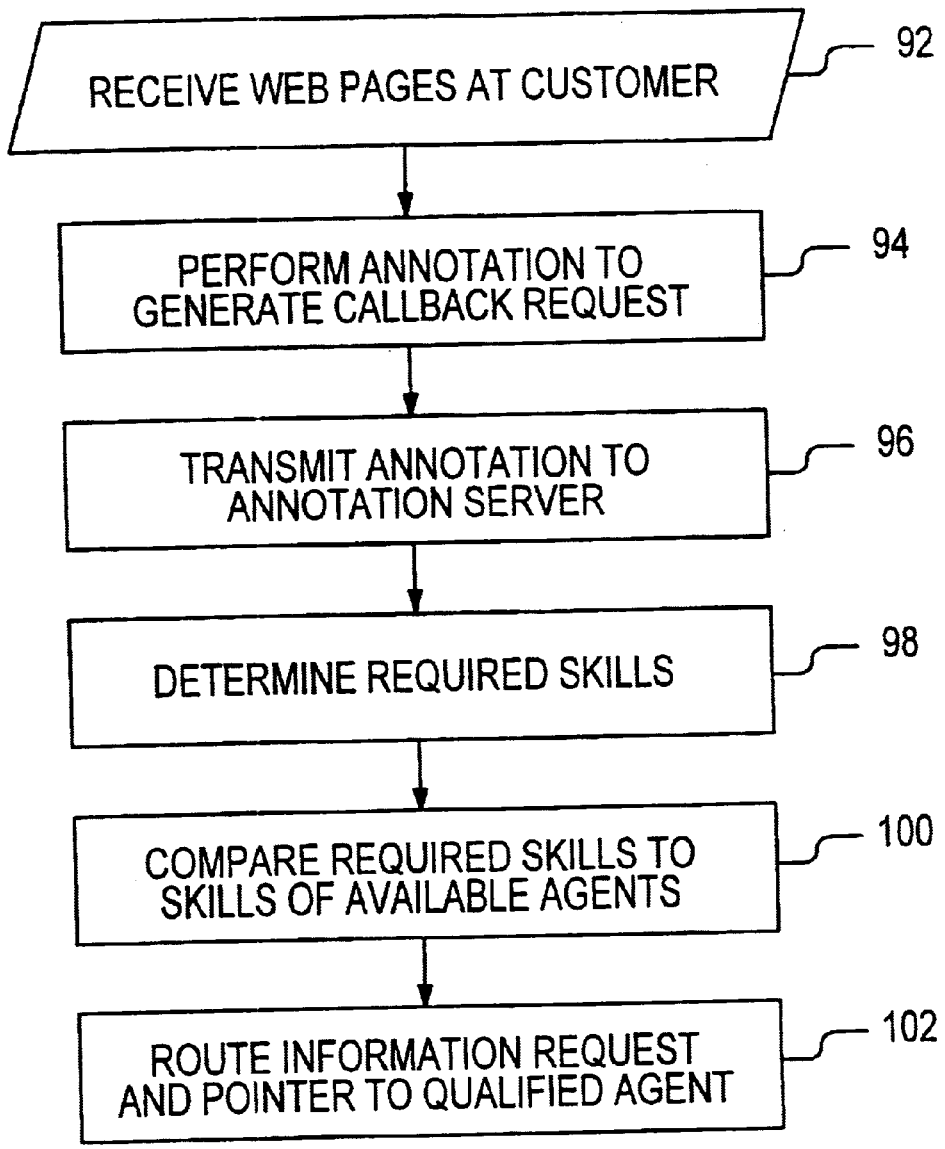
FIG. 4 is a process flow of a method for formulating a callback request at the customer terminal in FIG. 2.

The customer can utilize web document annotation to submit a callback request to the call center 10. While the customer is browsing web pages of the call center web site, the customer may select one or more of the web pages as templates for an annotation session. For example, if the customer is attempting to install a new hard drive on the customer's computer, the customer might annotate a web page which illustrates how the hard drive is connected to various other components of the computer to formulate a callback request. With reference to FIGS. 2 and 4, the customer terminal 52 utilizes the commercial web browser 70 to download the call center web pages of interest at step 92. The customer utilizes the annotation plug-in 68 at step 94 to annotate the web page(s) to formulate a callback request. The callback request is preferably in the form of a dynamic annotation.

At step 96, the customer terminal 52 submits the callback request annotation to the call center 10, where it is stored and processed by the indexing software 64 and the annotation database 66. At step 98, the indexing software 64 determines the skills required for handling the callback request by extracting key information from the annotated web pages based on textual information within the annotation, textual information in the underlying web pages which serve as templates for the annotation, and key words extracted from the voice information recorded into a dynamic annotation. The indexing software 64 communicates the callback request to the ACD server 18 together with the required skills data.

At step 100, the ACD server 18 compares the required skills data to the skills sets associated with the call center agents to identify a call center agent qualified to handle the callback request. At step 102, the ACD server 18 routes the callback request to a qualified agent, together with a pointer to the storage location of the annotated web pages in the annotation database 66. After obtaining the annotated web pages, the agent can choose to respond in a number of different ways. The agent might annotate the annotated web pages to build on the presentation made by the customer. The agent might enter annotation data on a non-annotated document, if an annotation of the customer's annotation fails to provide a clear and concise response. The agent can also respond by fax, e-mail, or by telephone. Alternatively, if the agent realizes that he or she is not qualified to handle the callback request, the agent can requeue the callback request for another skill which was not identified by the indexing software 64.

By entering a dynamic annotation data into a web page, either a customer or an agent can formulate a query or a response to a query in a manner that closely approximates a live presentation. The user is able to integrate voice, graphics and text manipulation, and gestures (e.g., by directing a pointer icon utilizing a mouse) into a recorded dynamic annotation. Moreover, the user is able to deliberate over the contents of the dynamic annotation if the annotation is not being streamed to a playback site simultaneously with its generation. The fact that the user can formulate the dynamic annotation at the user's own pace facilitates the design of a concise and effective presentation. On the call center side, this translates into increased efficiency and lower costs, because the call center agents can handle more calls if they are not tied up trying to explain a complicated solution over a live connection such as a telephone call. On the customer side, dynamic annotation can result in greater customer satisfaction if the customer is able to receive a concise solution to a problem in the form of a dynamic annotation.

Figure 5:
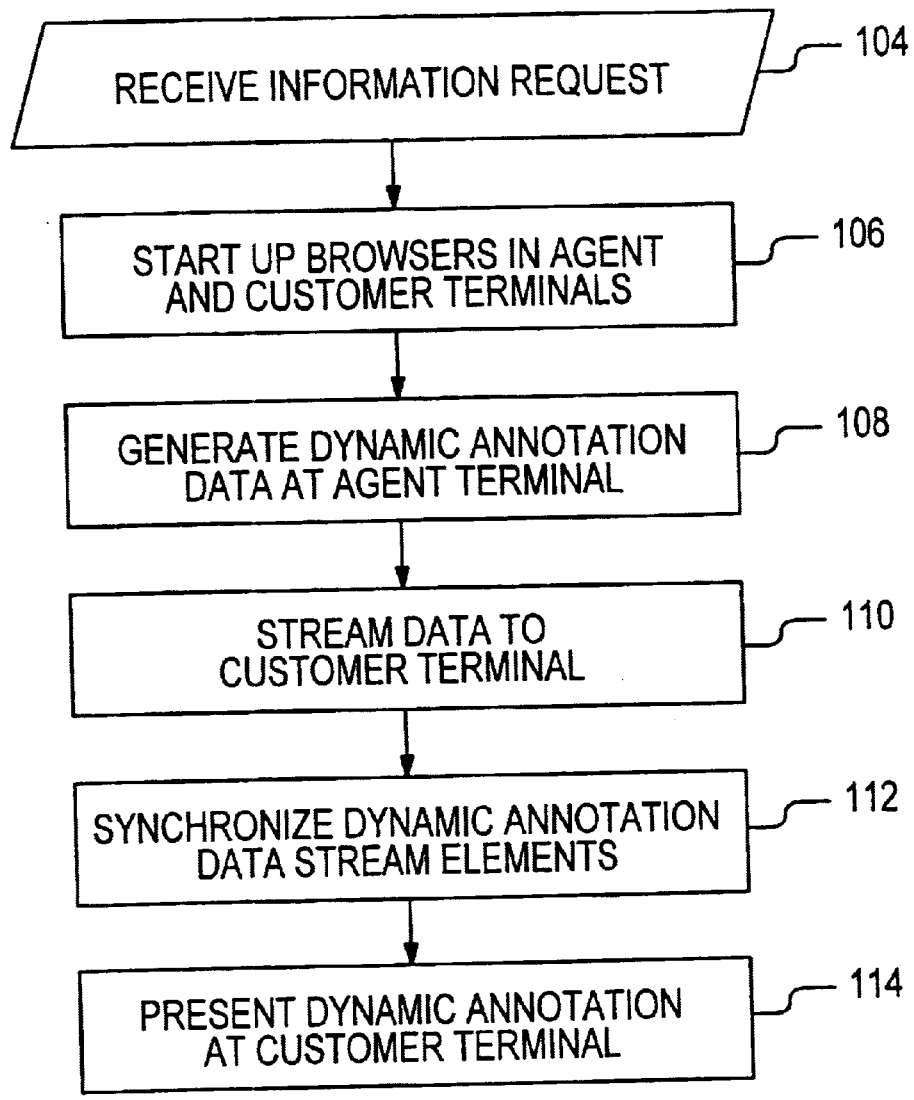
FIG. 5 is a process flow of a data sharing method for responding to a callback request utilizing the call center of FIG. 2.

A live connection between the customer and the agent can often facilitate a quick resolution to a problem, if the customer and agent are able to exchange a few questions and answers. To this end, the present invention also allows a dynamic annotation data sharing session in which dynamic annotation data is streamed between the agent terminal 50 and the customer terminal 52. With reference to FIGS. 2 and 5, the agent terminal receives an information request at step 104. The information request can be in the form of either a fax transmission, an e-mail message, a telephone call, or a web callback request. If the agent or the customer determines that a dynamic annotation data sharing session is the most effective way to solve the customer's problem, at step 106 the web browsers in the customer terminal 52 and the agent terminal 50 are enabled and a data sharing connection is established.

The agent terminal 50 and the customer terminal 52 both load a web page onto their respective browsers and either the agent or the customer can begin generating dynamic annotation data. For example, if the agent suggested the data sharing session, in steps 108 and 110 the agent terminal 50 generates dynamic annotation data and the dynamic annotation data is streamed to the customer terminal via the annotation server 44. The annotation data is synchronized at the customer terminal 52 at step 112. The synchronization includes synchronizing the voice information with text manipulation, video manipulation, and/or graphics manipulation. After synchronization, the dynamic annotation data is presented at the customer terminal 52 in step 114. If, on the other hand, the customer suggested the data sharing session to clarify a problem, the customer terminal 52 will initiate the data sharing session by transmitting a dynamic annotation data stream to the agent terminal 50. The different media of the data stream are then synchronized prior to presentation at the agent terminal. After an initial presentation by either the agent or the customer, the other party to the data sharing session can take over the data sharing session to respond to the initial presentation. Moreover, more than two parties can participate in the data sharing session.

In an alternative embodiment, the data sharing session can be performed without employing annotation plug-in software 68 and 72 at the customer terminal 52 or the agent terminal 50. In this embodiment, the annotation plug-in software is located at the annotation server 44. During a data sharing session, the user-generated multimedia actions are streamed from one terminal to the annotation server which utilizes the annotation plug-in software to process the multimedia actions before streaming them out to the other terminal.

In another alternative embodiment, the web-based call center 10 can be utilized for educational purposes. The call center agent in this embodiment is an educational instructor, such as a teacher or a professor, and the customer is a student. The annotation server 44 is utilized to store exams and assignments. The student can transmit questions about an exam or an assignment in the form of a web callback request that includes a statically or dynamically annotated web page. The instructor can respond by providing the student with an annotated version of the assignment or exam.

What is claimed is:

1. In a web-based call center which includes a server accessible by any of a plurality of customer terminals and any of a plurality of agent terminals, a communications method comprising the steps of:

storing an annotatable first document at said server such that said first document remains accessible in an annotatable condition following each of a plurality of non-synchronous downloads of said first document;

during each of a plurality of temporally separate download occasions, receiving a download of said first document in said annotatable condition at one of said customer and said agent terminals;

for each said download occasion, recording a particular sequence of multimedia actions performed on said download of said first document such that said recorded multimedia actions can be played back to display said multimedia actions in said particular sequence, said recorded multimedia actions being specific to said download occasion; and transmitting said recorded sequence of multimedia actions, via said server, to the other of said customer and said agent terminals as part of either an information request or a response to an information request, said transmitting being repeatable for each said download occasion;

wherein at least some of said recorded sequences of multimedia actions are recorded to provide data relevant to soliciting desired responsive information to be contained in responses to said information requests, with reception of each said information request during operation of said server initiating an automated search for key words in a corresponding said recorded sequence to determine appropriate processing of said corresponding recorded sequence.

2. The method of claim 1 further comprising the step of formatting said first document to enable capture of said particular sequence of multimedia actions performed on said first document, said formatting remaining intact following each said download occasion.

3. The method of claim 1 wherein said recording step includes recording at least one of voice information, video information, user-generated pointer gestures, user-generated drawings, manipulation of image objects, and manipulation of video objects.

4. The method of claim 1 wherein said recording step includes synchronizing recording of one of a traversal of a hyperlink, video information, and voice information with user actions, including at least one of manipulation of text objects, manipulation of image objects, and manipulation of video objects.

5. The method of claim 1 further comprising the steps of:

analyzing said key words to determine a first set of skills associated with said recorded sequence of multimedia actions; and correlating said first set of skills to skills sets of a plurality of call center agents to determine which of said call center agents are qualified to receive said information request.

6. The method of claim 1 wherein said searching step includes extracting key words from one of voice information included in said recorded sequence of multimedia actions, text included in said recorded sequence, and text from web pages underlying said recorded sequence.

7. The method of claim 1 wherein said step of transmitting said recorded sequence of multimedia actions is performed as a part of a data sharing session, wherein dynamic annotation data is streamed from said one of said customer and said agent terminals to the other of said customer and said agent terminals substantially simultaneously with generation of said annotation data, said data sharing session being limited to one said customer terminal and one said agent terminal.

8. The method of claim 7 wherein said step of recording said sequence includes transmitting said multimedia actions from said one of said customer and said agent terminals to a server and recording said multimedia actions at said server.

9. The method of claim 1 wherein said step of transmitting said recorded sequence is a step of transmitting said recorded sequence of multimedia actions independently of underlying data objects within said first document.

10. The method of claim 1 wherein said step of transmitting said recorded sequence of multimedia actions is a step of transmitting a dynamically annotated instructional document from a terminal of a teacher to a terminal of a student.

11. A call center with dynamic annotation capability comprising:

a document server connected to a communications network to provide a plurality of clients access to documents formatted for input of dynamic annotation data, said document server being configured to provide access to said documents as templates for repeated use of said documents in entering said dynamic annotation data;

an annotation server configured to provide storage for dynamically annotated documents received from said clients following independent user inputs of said dynamic annotation data to said formatted documents by said clients, at least a portion of said dynamically annotated documents including information requests received from customer client terminals, said annotation server including indexing software to extract key words from said information requests and to determine skill requirements relevant to each said information request; and a plurality of call center client terminals configured to process said information requests for presentation to call center agents, each call center client terminal including a dynamic annotation module responsive to user inputs to record a dynamic annotation session on one of said formatted documents, said recorded dynamic annotation session including sequentially recorded data object manipulations configured for playback to display said sequentially recorded data object manipulations, said data object manipulations including at least one of image object manipulation, text object manipulation, video object manipulation, and recording of voice information.

12. The call center of claim 11 further comprising a document registration tool configured to automatically format said documents to enable capture of user-generated multimedia actions performed in said dynamic annotation sessions.

13. The call center of claim 11 wherein said dynamic annotation module of each call center client terminal is configured to establish a data sharing session with a customer client terminal in which dynamic annotation data is streamed to said customer client terminal as said dynamic annotation data is generated.

14. The call center of claim 11 further comprising an Automatic Call Distributor (ACD) responsive to receipt of said information requests to compare said skill requirements to skill sets associated with said call center agents to determine which of said call center agents are qualified to handle particular information requests.

15. The call center of claim 11 wherein said indexing software is used to ascertain said skill requirements based at least partially on one of text within underlying web pages included in a customer dynamic annotation session, text generated by a customer during said customer dynamic annotation session, and text extracted from voice information generated by said customer during said customer dynamic annotation session.

* * * * *